(12) United States Patent
Chen et al.

(10) Patent No.: US 10,705,571 B1
(45) Date of Patent: Jul. 7, 2020

(54) FOLDABLE ELECTRONIC DEVICE AND DEVICE PROTECTION METHOD

(71) Applicant: Wistron Corporation, New Taipei (TW)

(72) Inventors: Yuan-Tai Chen, New Taipei (TW); Chia-Hao Liang, New Taipei (TW); Cheng-Kuo Lee, New Taipei (TW); Ming-Jen Chan, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/440,952

(22) Filed: Jun. 13, 2019

(30) Foreign Application Priority Data

Mar. 22, 2019 (TW) .............................. 108109979 A

(51) Int. Cl.
| | |
|---|---|
| *G06F 1/16* | (2006.01) |
| *G08B 21/18* | (2006.01) |
| *E05D 11/10* | (2006.01) |
| *F16D 65/16* | (2006.01) |
| *F16D 63/00* | (2006.01) |
| *F16D 121/20* | (2012.01) |
| *F16D 127/02* | (2012.01) |

(52) U.S. Cl.
CPC ........ *G06F 1/1656* (2013.01); *E05D 11/1007* (2013.01); *F16D 63/006* (2013.01); *F16D 65/16* (2013.01); *G06F 1/1616* (2013.01); *G06F 1/1681* (2013.01); *G06F 1/1688* (2013.01); *G08B 21/18* (2013.01); *E05Y 2201/21* (2013.01); *E05Y 2201/232* (2013.01); *E05Y 2201/246* (2013.01); *E05Y 2900/606* (2013.01); *F16D 2121/20* (2013.01); *F16D 2127/02* (2013.01)

(58) Field of Classification Search
CPC .... G06F 1/1656; G06F 1/1616; G06F 1/1681; G06F 1/1688; E05D 11/1007; F16D 63/006; F16D 65/16; G08B 21/18
USPC .......................................................... 340/635
See application file for complete search history.

(56) References Cited

U.S. PATENT DOCUMENTS

| | | | | |
|---|---|---|---|---|
| 5,598,607 | A | * | 2/1997 | Katagiri ................ E05D 11/084 16/337 |
| 6,259,597 | B1 | * | 7/2001 | Anzai ................... G06F 1/1616 345/169 |
| 9,864,402 | B1 | * | 1/2018 | Liang .................... H01F 7/0252 |
| 2001/0009500 | A1 | * | 7/2001 | Selker .................. G06F 1/1628 361/679.55 |

(Continued)

FOREIGN PATENT DOCUMENTS

| | | |
|---|---|---|
| CN | 103573795 | 2/2014 |
| CN | 104067196 A | 9/2014 |

*Primary Examiner* — Kerri L Mcnally
(74) *Attorney, Agent, or Firm* — Winston Hsu

(57) ABSTRACT

A foldable electronic device includes a first base, a second base, a hinge, a brake, an object sensor, and a controller. The hinge pivotally connects the first base to the second base. The brake is disposed in the hinge. When the first base is expanded with respect to the second base, the object sensor senses whether an object is placed on the second base. When the object sensor senses that the object is placed on the second base, the object sensor sends out a sensed signal. The controller selectively switches on the brake in response to the sensed signal, so as to restrain a rotating angle formed by the first base and the second base.

13 Claims, 11 Drawing Sheets

(56) References Cited

U.S. PATENT DOCUMENTS

| | | | |
|---|---|---|---|
| 2002/0050024 A1* | 5/2002 | Murayama | G06F 1/1616 16/221 |
| 2005/0105263 A1* | 5/2005 | Tanaka | G06F 1/162 361/679.06 |
| 2011/0013350 A1* | 1/2011 | Tracy | G06F 1/1616 361/679.21 |
| 2011/0102982 A1* | 5/2011 | Minaguchi | G06F 1/1681 361/679.01 |
| 2015/0138713 A1* | 5/2015 | Onda | G06F 1/1679 361/679.27 |
| 2017/0044810 A1* | 2/2017 | Mcbroom | F16D 55/02 |

* cited by examiner

FOLDABLE ELECTRONIC DEVICE AND DEVICE PROTECTION METHOD

BACKGROUND OF THE DISCLOSURE

1. Field of the Disclosure

The disclosure relates to a foldable electronic device and a device protection method and, more particularly, to a foldable electronic device and a device protection method capable of avoiding damage due to misoperation.

2. Description of the Prior Art

As technology advances and develops, various foldable electronic devices, such as a notebook computer, a mobile phone, etc. have been considered a necessity by a lot of people in daily life. Furthermore, with development of touch technology, a touch panel has become a main tool for data input in the aforesaid foldable electronic devices. However, if a user needs to input a larger number of letters, symbols and/or numerals, the touch panel is more inconvenient than a keyboard for operation. Accordingly, when a cover of the foldable electronic device is expanded with respect to a base, some users may place a keyboard on the base for inputting data. If the user closes the cover with respect to the base without removing the keyboard from the base, a display panel disposed on the cover may be hit and damaged by the keyboard.

SUMMARY OF THE DISCLOSURE

The disclosure provides a foldable electronic device and a device protection method capable of avoiding damage due to misoperation, so as to solve the aforesaid problems.

According to an embodiment of the disclosure, a foldable electronic device includes a first base, a second base, a hinge, a brake, an object sensor, and a controller. The hinge pivotally connects the first base to the second base. The brake is disposed in the hinge. The object sensor is selectively disposed in one of the first base and the second base. The controller is electrically connected to the brake and the object sensor. When the first base is expanded with respect to the second base, the object sensor senses whether an object is placed on the second base. When the object sensor senses that the object is placed on the second base, the object sensor sends out a sensed signal. The controller selectively switches on the brake in response to the sensed signal, so as to restrain a rotating angle formed by the first base and the second base.

According to another embodiment of the disclosure, a device protection method is adapted to a foldable electronic device. The foldable electronic device includes a first base, a second base, and a brake. The device protection method includes steps of when the first base is expanded with respect to the second base, sensing whether an object is placed on the second base; and when sensing that the object is placed on the second base, selectively switching on the brake, so as to restrain a rotating angle formed by the first base and the second base.

As mentioned in the above, the disclosure disposes the brake in the hinge and utilizes the object sensor to sense whether an object (e.g. keyboard) is placed on the second base. When the object sensor senses that the object is placed on the second base, the controller may selectively switch on the brake, so as to restrain the rotating angle formed by the first base and the second base. Accordingly, if a user closes the first base with respect to the second base without removing the object from the second base, the brake may stop the first base at a specific angle, such that a component (e.g. display panel) disposed on the first base may not be hit by the object placed on the second base. Therefore, the disclosure can avoid damage due to misoperation for the foldable electronic device effectively.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a perspective view illustrating a brake shown in FIG. 6 being switched from off to on.

DETAILED DESCRIPTION

Figure 1:
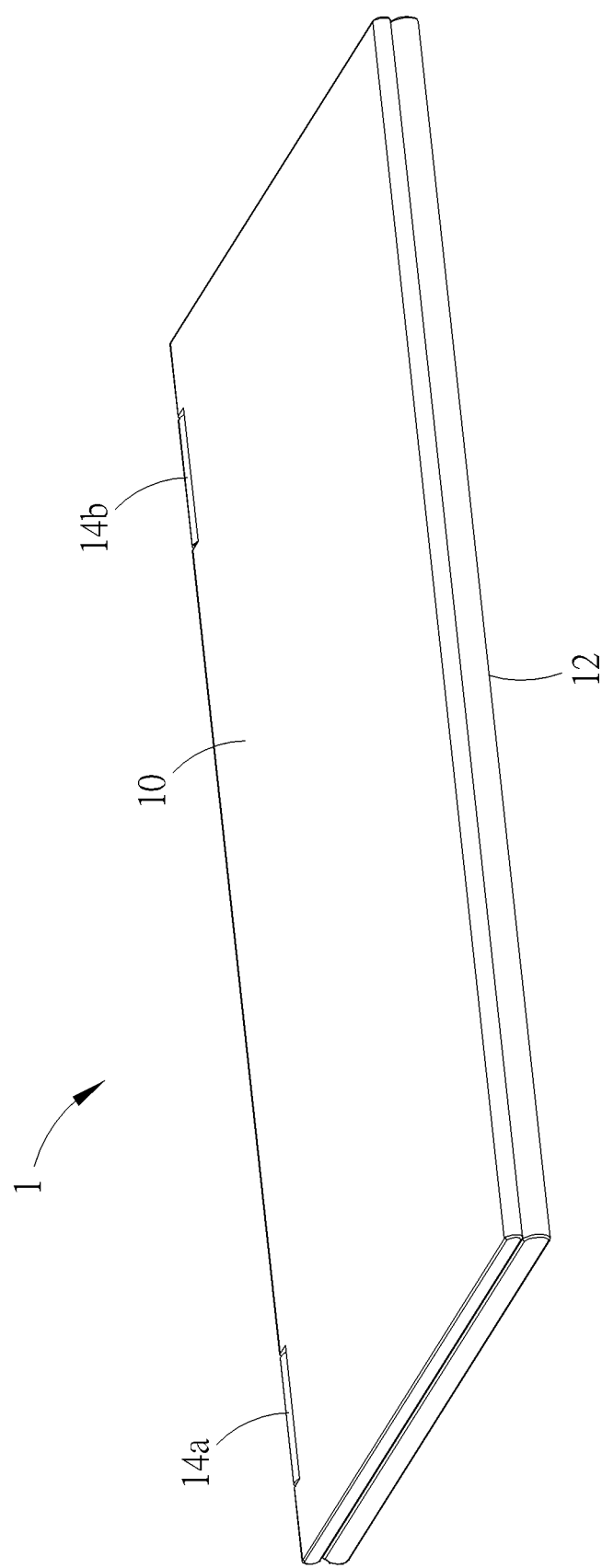
FIG. 1 is a perspective view illustrating a foldable electronic device according to an embodiment of the disclosure.
Figure 2:
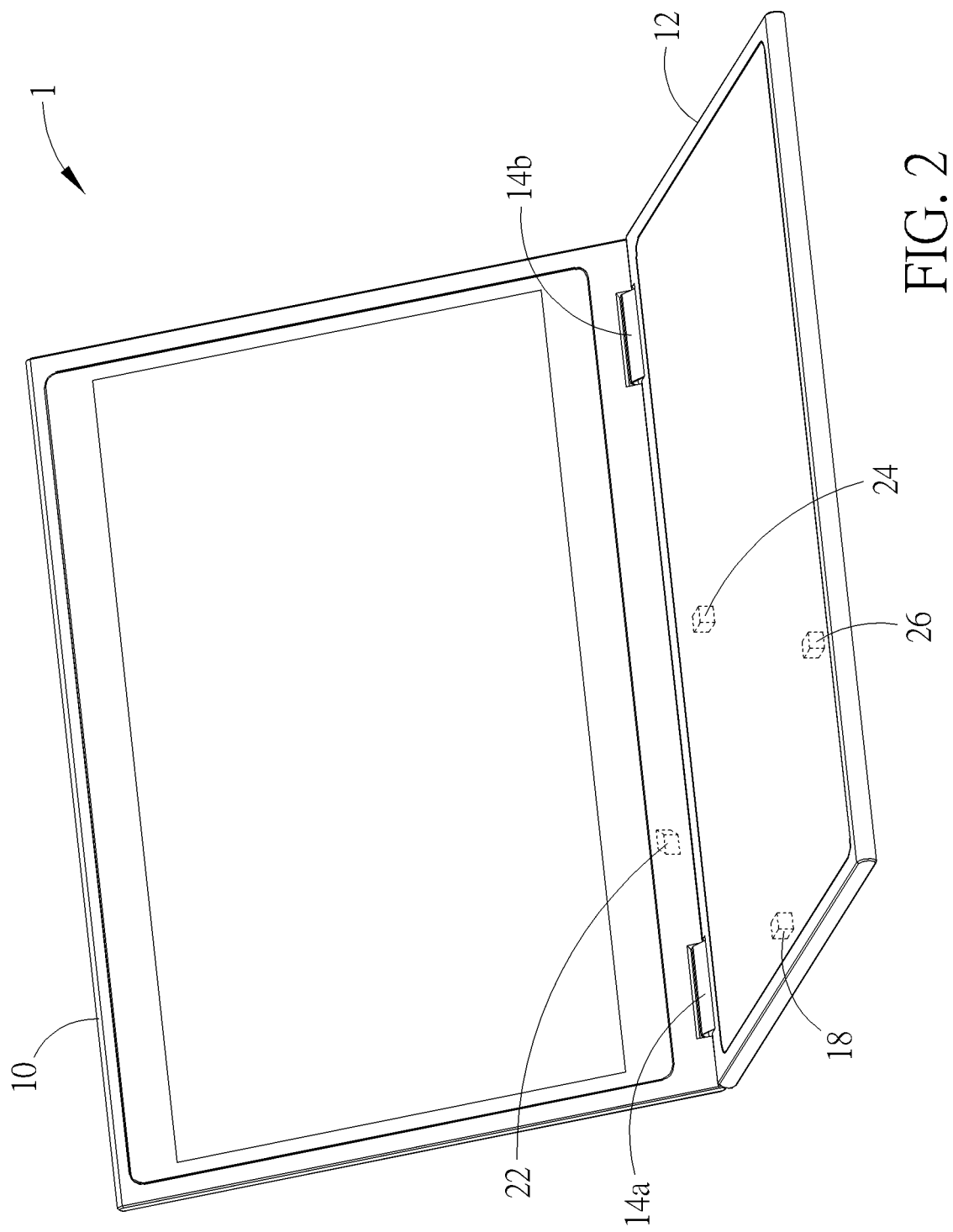
FIG. 2 is a perspective view illustrating a first base shown in FIG. 1 being expanded with respect to a second base.
Figure 3:
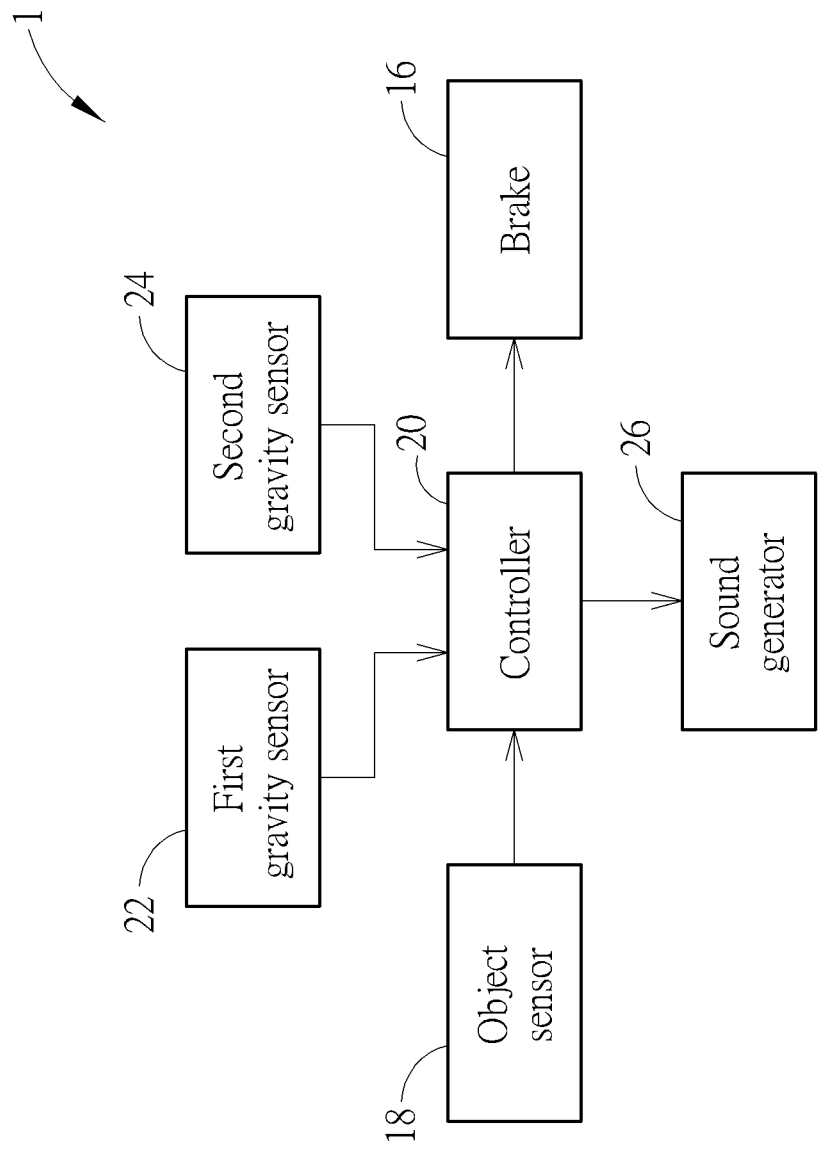
FIG. 3 is a functional block diagram illustrating the foldable electronic device shown in FIG. 1.
Figure 10:
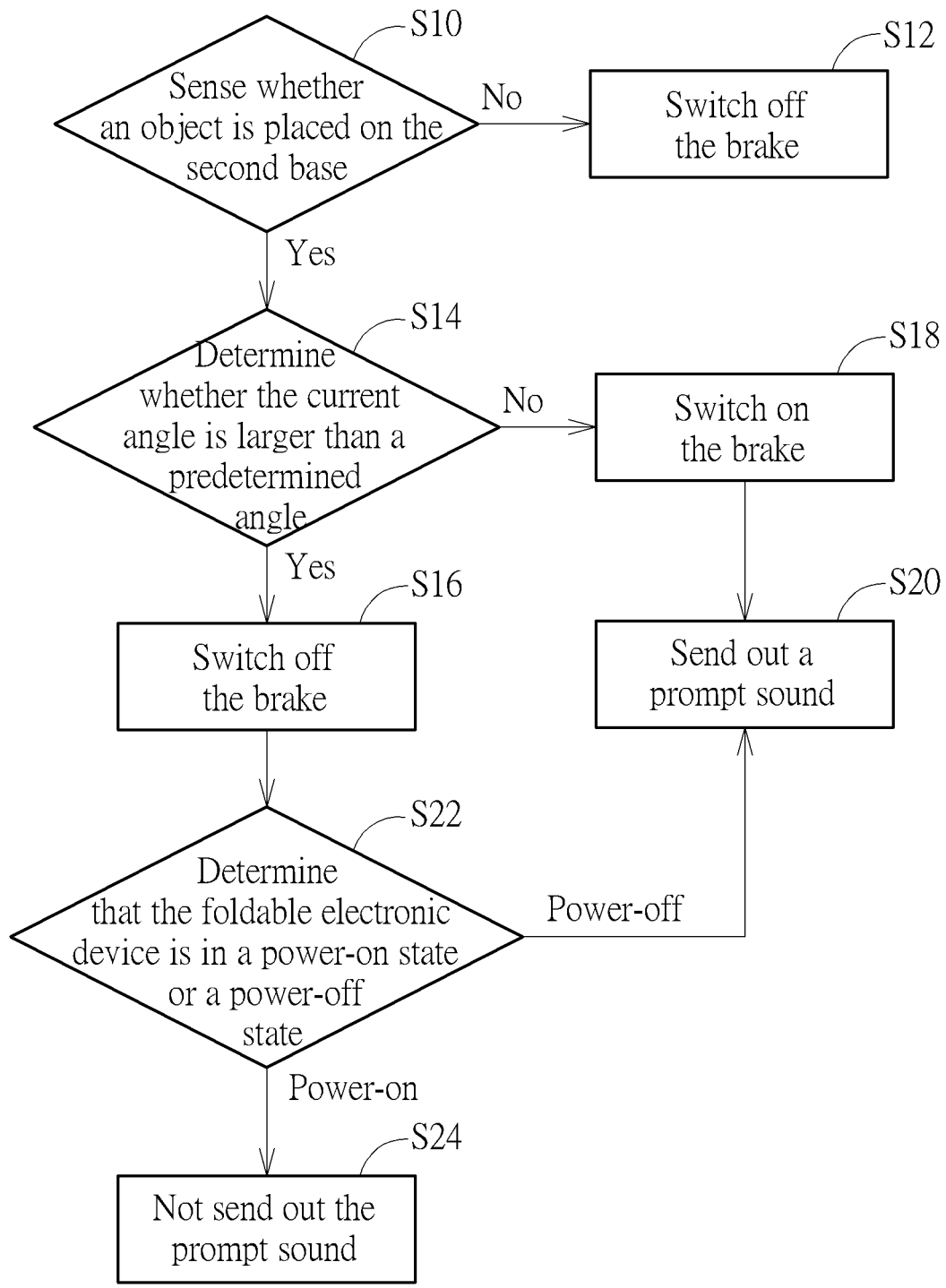
FIG. 10 is a flowchart illustrating a device protection method according to an embodiment of the disclosure.

As shown in FIGS. 1 to 3, a foldable electronic device 1 includes a first base 10, a second base 12, two hinges 14*a*, 14*b*, a brake 16, an object sensor 18, a controller 20, a first gravity sensor 22, a second gravity sensor 24, and a sound generator 26. A device protection method shown in FIG. 10 is adapted to the aforesaid foldable electronic device 1. In this embodiment, the foldable electronic device 1 may be, but not limited to, a notebook computer. The hinges 14*a*, 14*b* pivotally connect the first base 10 to the second base 12, such that the first base 10 may be closed (as shown in FIG. 1) or expanded (as shown in FIG. 2) with respect to the second base 12. In this embodiment, the brake 16 maybe disposed in the hinge 14*a*. In another embodiment, the brake 16 maybe disposed in the hinge 14*b*. In another embodiment, two brakes 16 maybe disposed in the two hinges 14*a*, 14*b*, respectively.

The object sensor 18 is disposed in the second base 12. In this embodiment, the object sensor 18 may be a magnetic sensor (e.g. Hall sensor). The controller 20 may be selectively disposed in one of the first base 10 and the second base 12. The first gravity sensor 22 is disposed in the first base 10 and the second gravity sensor 24 is disposed in the second base 12. The sound generator 26 is disposed in the second base 12. In another embodiment, the sound generator 26 may be disposed in the first base 10. In other words, the sound generator 26 may be selectively disposed in one of the first base 10 and the second base 12. In this embodiment, the sound generator 26 may be a speaker or a buzzer. As shown in FIG. 3, the controller 20 is electrically connected to the brake 16, the object sensor 18, the first gravity sensor 22, the second gravity sensor 24, and the sound generator 26.

Figure 4:
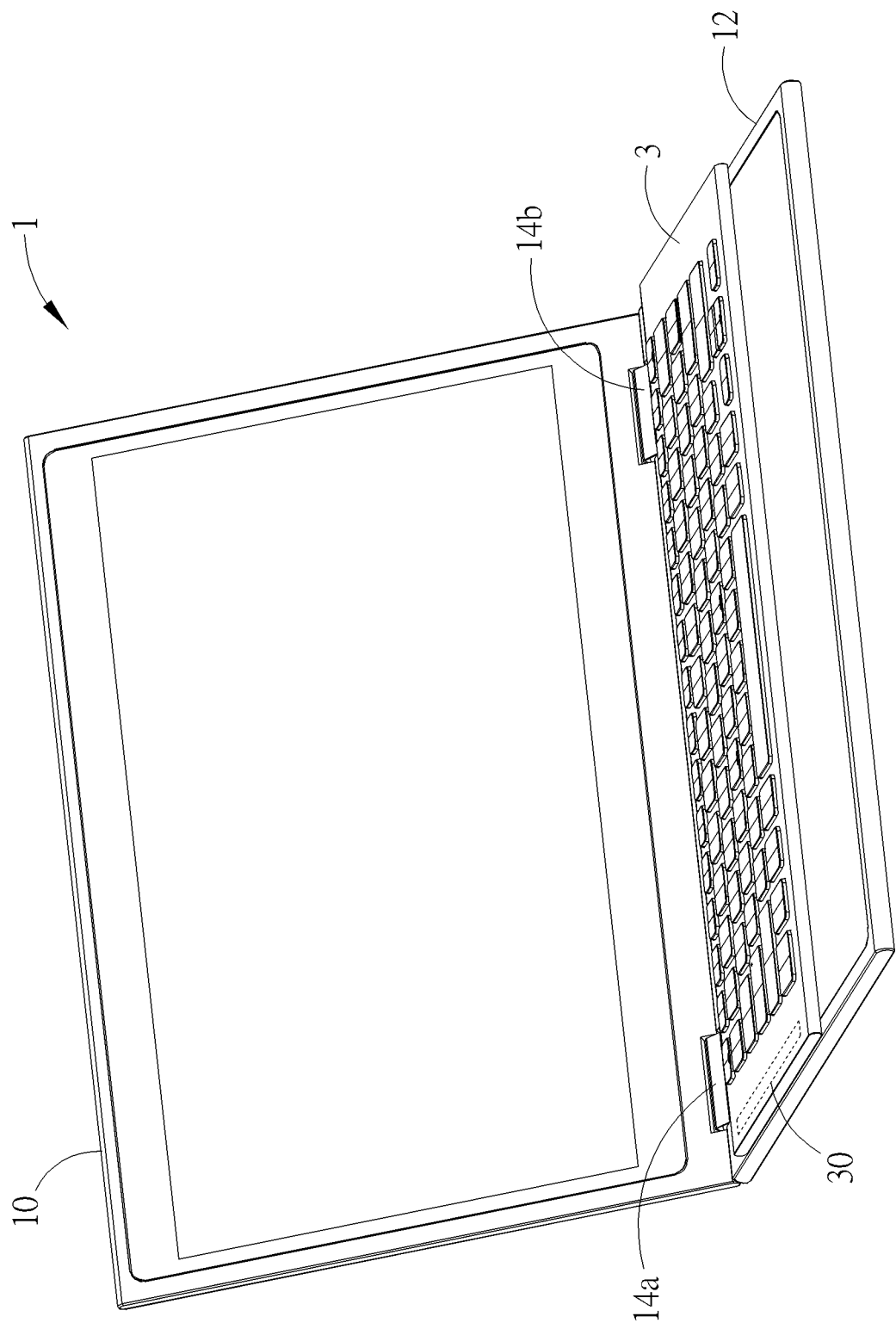
FIG. 4 is a perspective view illustrating an object placed on the second base shown in FIG. 2.

When the first base 10 is expanded with respect to the second base 12 (as shown in FIG. 2), the object sensor 18 is configured to sense whether an object is placed on the second base 12 (step S10 in FIG. 10). As shown in FIG. 4, a user may place an object 3 (e.g. keyboard) on the second base 12, so as to use the object 3 to operate the foldable electronic device 1. In this embodiment, the object 3 may include a magnetic member 30 (e.g. magnet). Accordingly, the object sensor 18 may sense whether the object 3 is placed on the second base 12 by sensing variation of magnetic field. When the object sensor 18 senses that the object 3 is placed on the second base 12, the object sensor 18 sends out a sensed signal. Then, the controller 20 selectively switches on the brake 16 in response to the sensed signal, so as to restrain a rotating angle formed by the first base 10 and the second base 12. It should be noted that when the object 3 is not placed on the second base 12, the controller 20 switches off the brake 16 (step S12 in FIG. 10).

In this embodiment, the controller 20 may calculate a current angle formed by the first base 10 and the second base 12 according to a sensed result of the first gravity sensor 22 and the second gravity sensor 24. Accordingly, when the object sensor 18 senses that the object 3 is placed on the second base 12 and then sends out the sensed signal, the controller 20 may determine whether the current angle is larger than a predetermined angle in response to the sensed signal (step S14 in FIG. 10). When the current angle is larger than the predetermined angle, the controller 20 switches off the brake 16 (step S16 in FIG. 10). When the current angle is smaller than or equal to the predetermined angle, the controller 20 switches on the brake 16 (step S18 in FIG. 10). For example, the aforesaid predetermined angle may be set to be 90 degrees. Accordingly, when the current angle is larger than 90 degrees (as shown in FIG. 4), the controller 20 switches off the brake 16; and when the current angle is smaller than or equal to 90 degrees, the controller 20 switches on the brake 16.

Figure 6:
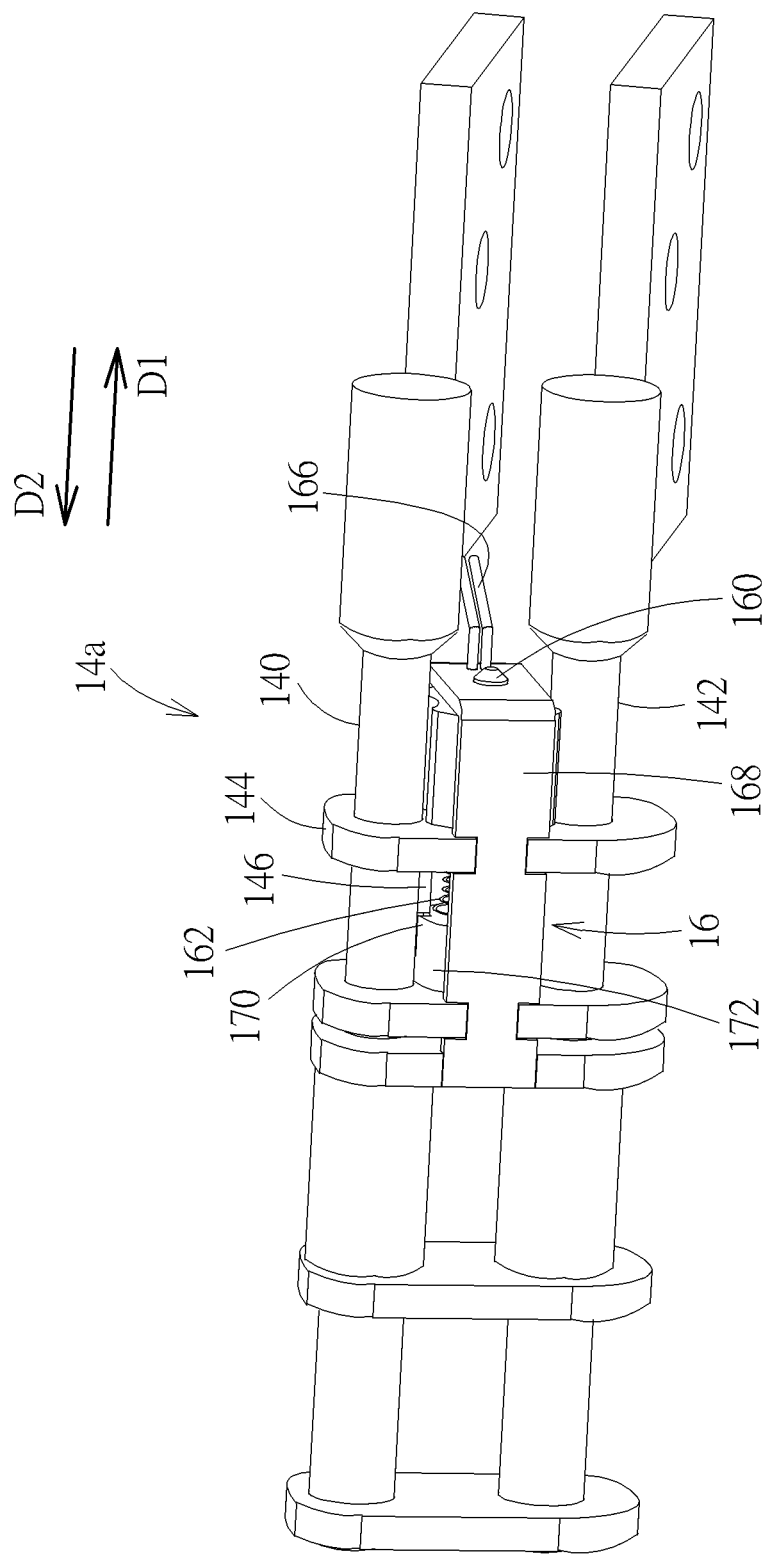
FIG. 6 is a perspective view illustrating the inside of a hinge shown in FIG. 4.
Figure 7:
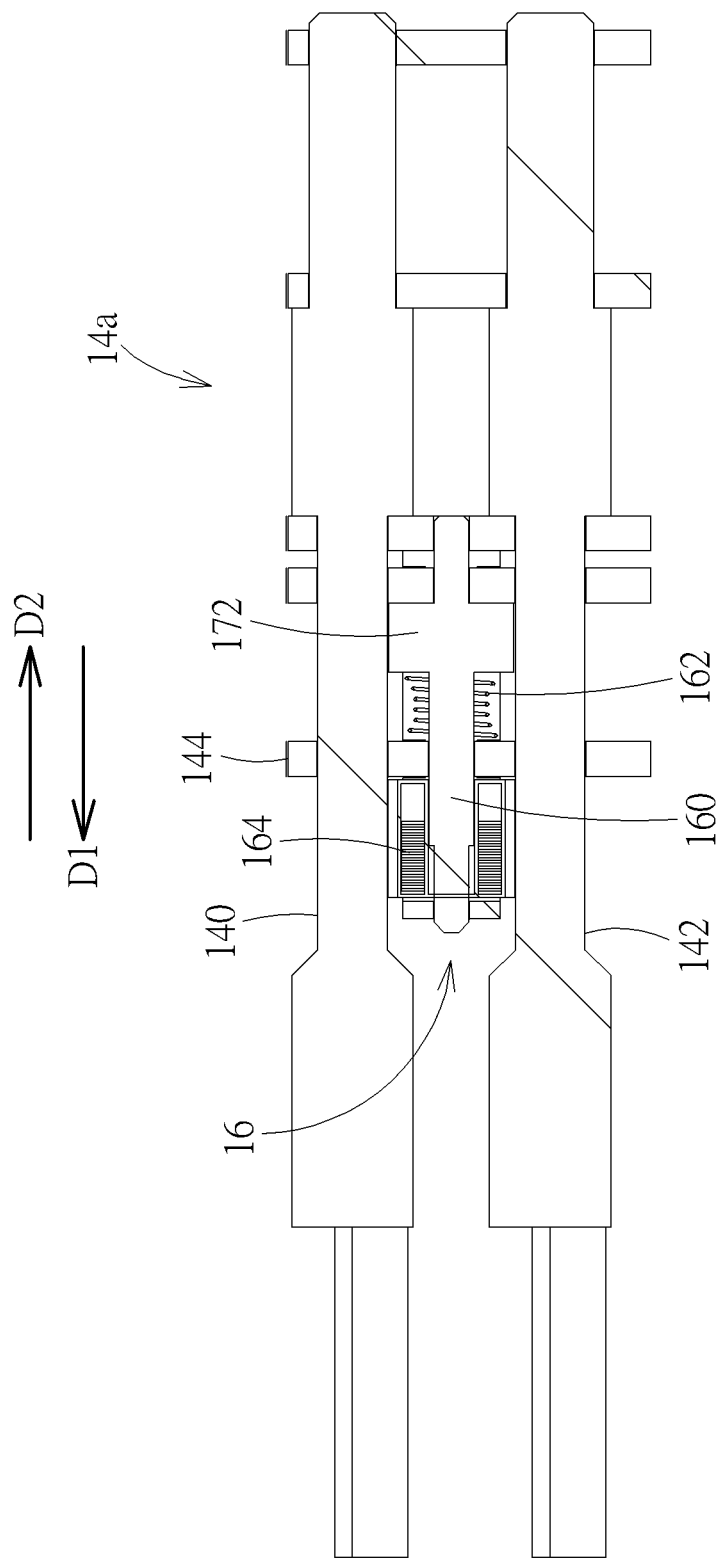
FIG. 7 is a sectional view illustrating the hinge shown in FIG. 6.
Figure 8:
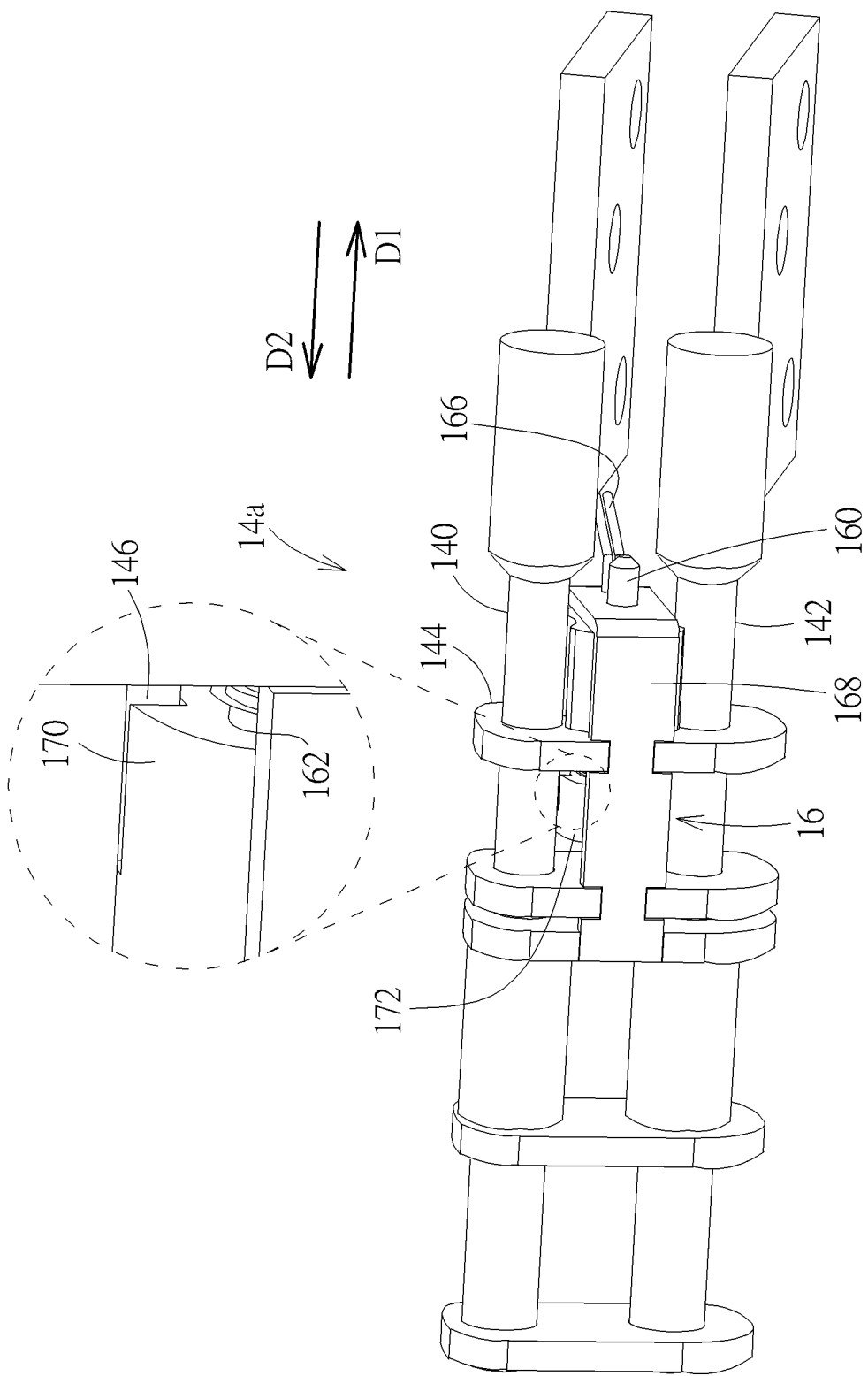
Figure 9:
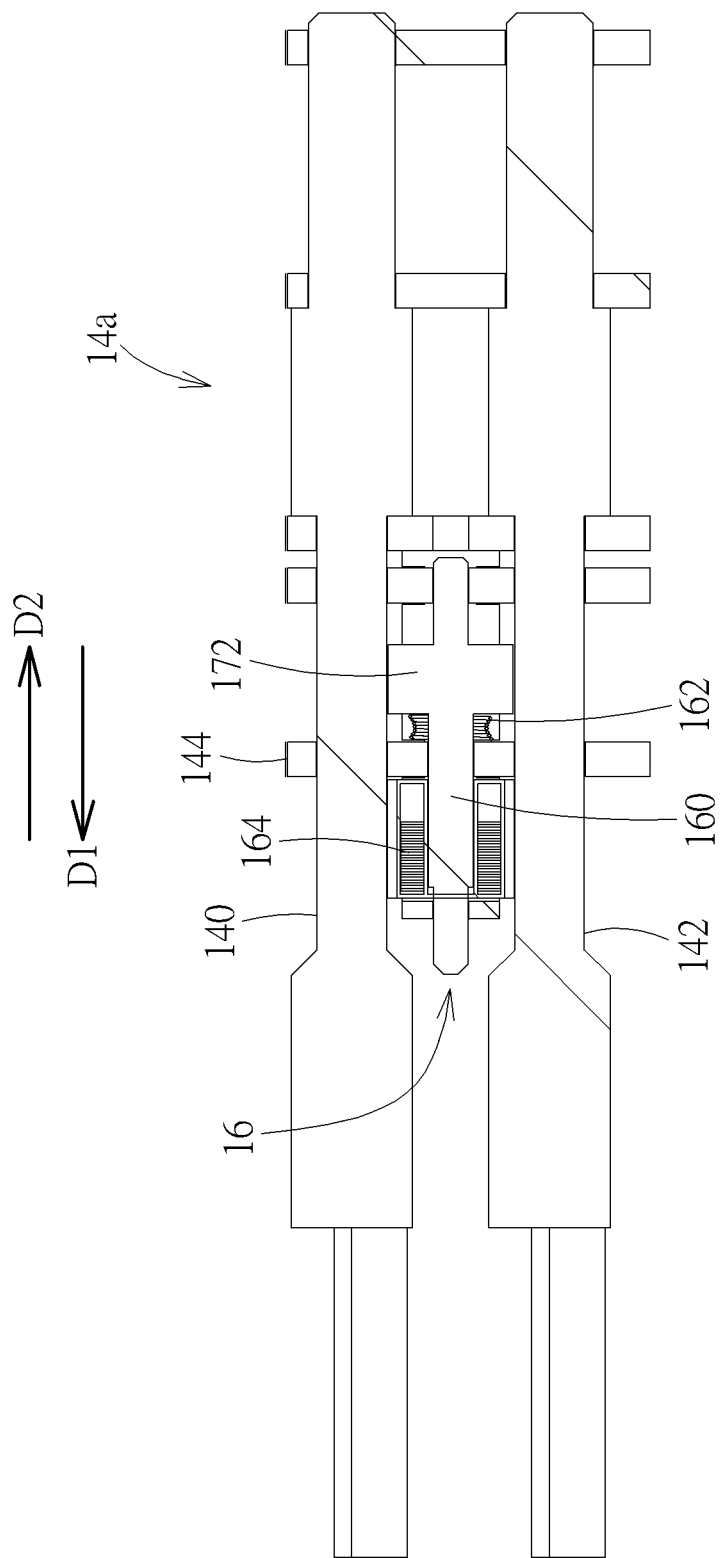
FIG. 9 is a sectional view illustrating the hinge shown in FIG. 8.

Referring to FIGS. 6 to 9, the brake 16 shown in FIGS. 6 and 7 is switched off and the brake 16 shown in FIGS. 8 and 9 is switched on.

In this embodiment, the hinge 14a may include two rotating shafts 140, 142 and a plurality of fixing plates 144, wherein the rotating shafts 140, 142 are pivotally connected to the fixing plates 144. The rotating shaft 140 may be connected to the first base 10 and the rotating shaft 142 may be connected to the second base 12, such that the first base 10 may rotate with respect to the second base 12. Furthermore, the rotating shaft 140 may have a first restraining portion 146.

In this embodiment, the brake 16 may be a solenoid valve. The brake 16 may include a braking member 160, a spring 162, a coil 164, a wire 166, and a fixing base 168. The fixing base 168 is disposed on the fixing plate 144. The braking member 160 is movably disposed in the fixing base 168. The braking member 160 may have a second restraining portion 170 and a stop portion 172. The spring 162 is disposed on the braking member 160, wherein opposite ends of the spring 162 respectively abut against the fixing plate 144 and the stop portion 172 of the braking member 160. The coil 164 surrounds an end of the braking member 160. The wire 166 is connected to the coil 164 and exposed from the fixing plate 168. The controller 20 may control a power source to supply or cut off power for the wire 166, so as to switch on or off the brake 16.

Figure 5:
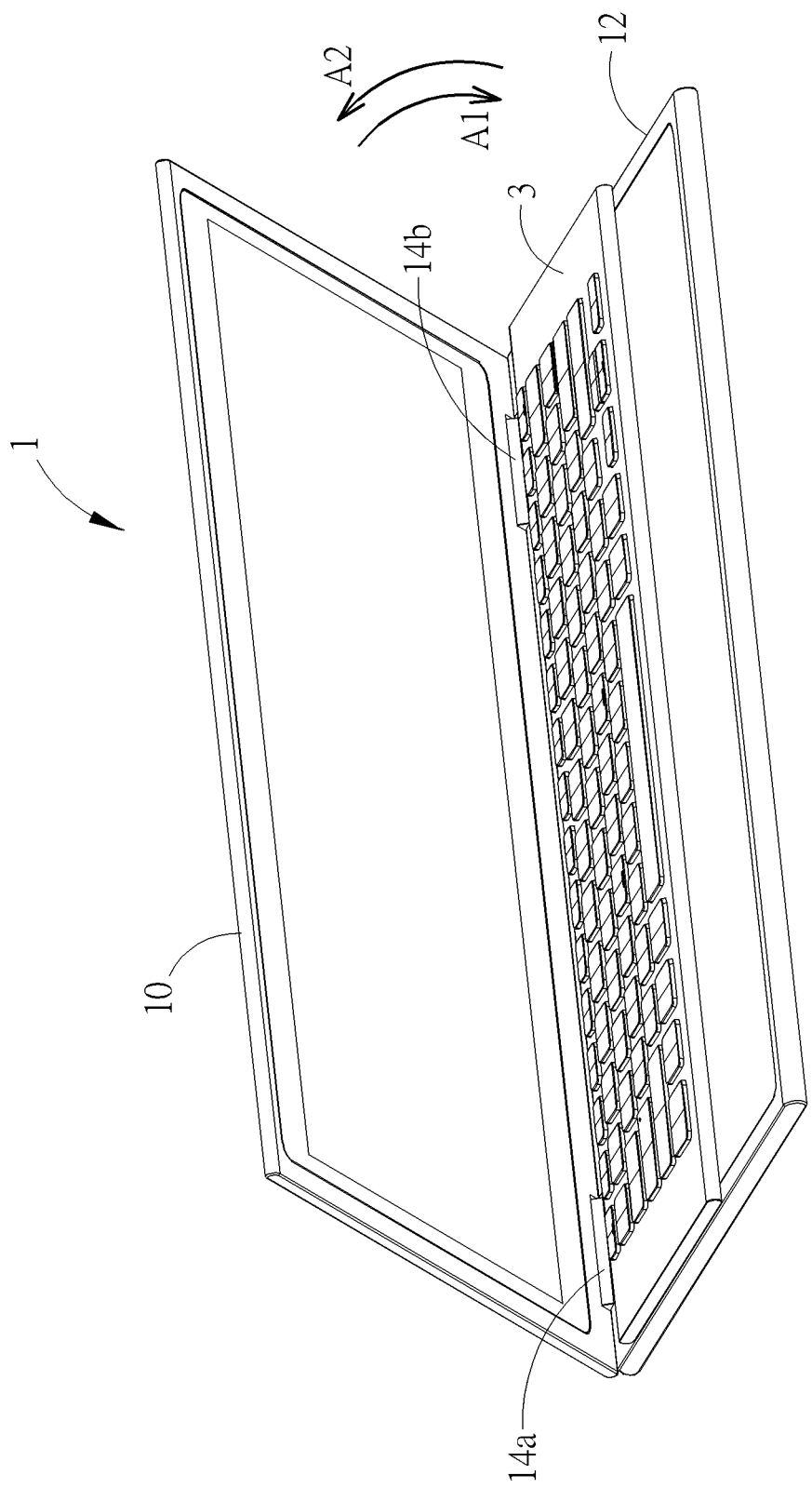
FIG. 5 is a perspective view illustrating the first base shown in FIG. 4 being rotated with respect to the second base.

When the brake 16 is switched from off (as shown in FIGS. 6 and 7) to on (as shown in FIGS. 8 and 9), the braking member 160 moves in a first direction D1 with respect to the rotating shafts 140, 142, such that the second restraining portion 170 moves to a position corresponding to the first restraining portion 146, and the stop portion 172 compresses the spring 162. At this time, the first restraining portion 146 may cooperate with the second restraining portion 170 to restrain the rotating angle formed by the first base 10 and the second base 12. For example, when the first base 10 rotates with respect to the second base 12 to an angle (e.g. 40 degrees) shown in FIG. 5, the second restraining portion 170 stops the first restraining portion 146, such that the first base 10 cannot keep rotating in a direction of an arrow A1 shown in FIG. 5. Accordingly, the disclosure can prevent a component (e.g. display panel) disposed on the first base 10 from being hit and damaged by the object 3 placed on the second base 12. It should be noted that when the brake 16 is switched on, the first base 10 may still rotate in a direction of an arrow A2 shown in FIG. 5. Once the current angle formed by the first base 10 and the second base 12 is larger than the aforesaid predetermined angle, the controller 20 switches off the brake 16.

When the brake 16 is switched from on (as shown in FIGS. 8 and 9) to off (as shown in FIGS. 6 and 7), the braking member 160 is pushed by the spring 162 to move in a second direction D2 with respect to the rotating shafts 140, 142, such that the second restraining portion 170 is away from the first restraining portion 146, wherein the aforesaid first direction D1 is opposite to the second direction D2. For further illustration, when the current angle formed by the first base 10 and the second base 12 is larger than the aforesaid predetermined angle, it means that the component (e.g. display panel) disposed on the first base 10 may not hit the object 3 placed on the second base 12. Accordingly, the brake 16 maybe switched off to save power.

In this embodiment, when the brake 16 is switched on, it means that the user may close the first base 10 with respect to the second base 12. Therefore, the controller 20 may control the sound generator 26 to send out a prompt sound (step S20 in FIG. 10) to inform the user the object 3 is still placed on the second base 12. In this embodiment, the prompt sound may be a beep or other sound effects according to practical applications.

In this embodiment, when the brake 16 is switched off, the controller 20 may further determine that the foldable electronic device 1 is in a power-on state or a power-off state (step S22 in FIG. 10). When the foldable electronic device 1 is in the power-off state, it means that the user does not need to use the foldable electronic device 1. Accordingly, the controller 20 may control the sound generator 26 to send out a prompt sound (step S20 in FIG. 10) to inform the user the object 3 is still placed on the second base 12. When the foldable electronic device 1 is in the power-on state, it means that the user uses the foldable electronic device 1 normally. Accordingly, the controller 20 does not need to control the sound generator 26 to send out the prompt sound (step S24 in FIG. 10).

In another embodiment, the aforesaid object sensor 18 may be a touch sensor (e.g. touch panel) and disposed in the second base 12, and the aforesaid object 3 may include a conductor (i.e. the aforesaid magnetic member 30 may be replaced by the conductor). Accordingly, the object sensor 18 may sense whether the object 3 is placed on the second base 12 by sensing variation of capacitance.

In another embodiment, the aforesaid object sensor 18 may be a depth sensor (e.g. depth camera) and disposed in the first base 10. Accordingly, the object sensor 18 may project a specific pattern onto the second base 12, capture images, and then sense whether the object 3 is placed on the second base 12 by analyzing depth information.

Therefore, according to the aforesaid embodiments, the disclosure may selectively dispose the object sensor 18 in one of the first base 10 and the second base 12 according to the type of the object sensor 18.

Figure 11:
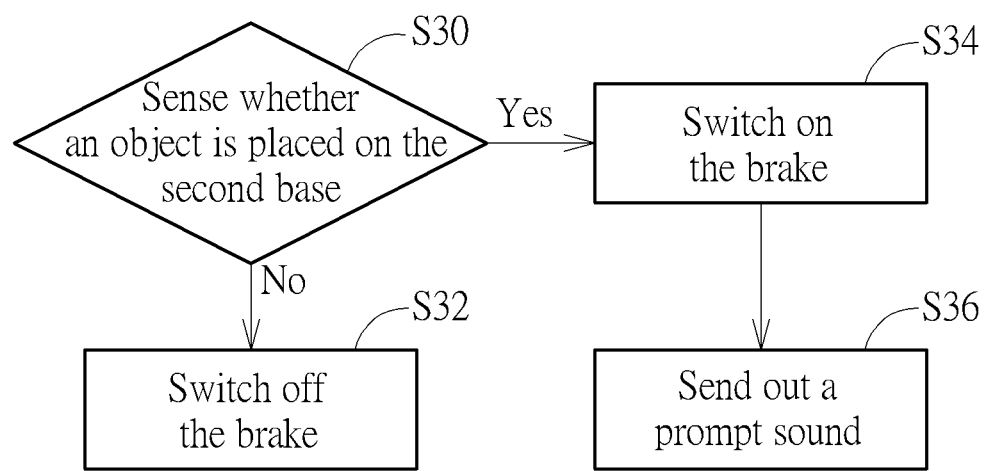
FIG. 11 is a flowchart illustrating a device protection method according to another embodiment of the disclosure.

As shown in FIG. 11, a device protection method according to another embodiment of the disclosure is also adapted to the aforesaid foldable electronic device 1. First, the object sensor 18 senses whether an object is placed on the second base 12 (step S30 in FIG. 11). When the object 3 is not placed on the second base 12, the controller 20 switches off the brake 16 (step S32 in FIG. 11). When the object sensor 18 senses that the object 3 is placed on the second base 12, the controller immediately switches on the brake 16 in response to the sensed signal (step S34 in FIG. 11). In other words, the disclosure may not need to determine whether the current angle formed by the first base 10 and the second base 12 is larger than the aforesaid predetermined angle. At this time, the foldable electronic device 1 may omit the first gravity sensor 22 and the second gravity sensor 24 mentioned in the above. When the brake 16 is switched on, the controller 20 may control the sound generator 26 to send out a prompt sound (step S36 in FIG. 11) to inform the user the object 3 is placed on the second base 12.

It should be noted that the detailed embodiments of the device protection method of the disclosure are mentioned in the above and those will not be depicted herein again. Furthermore, each part or function of the control logic of the device protection method may be implemented by a combination of software and hardware.

As mentioned in the above, the disclosure disposes the brake in the hinge and utilizes the object sensor to sense whether an object (e.g. keyboard) is placed on the second base. When the object sensor senses that the object is placed on the second base, the controller may selectively switch on the brake, so as to restrain the rotating angle formed by the first base and the second base. Accordingly, if a user closes the first base with respect to the second base without removing the object from the second base, the brake may stop the first base at a specific angle, such that a component (e.g. display panel) disposed on the first base may not be hit by the object placed on the second base. Therefore, the disclosure can avoid damage due to misoperation for the foldable electronic device effectively.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A foldable electronic device comprising:
a first base;
a second base;
a hinge pivotally connecting the first base to the second base;
a brake disposed in the hinge;
an object sensor selectively disposed in one of the first base and the second base; and
a controller electrically connected to the brake and the object sensor;
wherein when the first base is expanded with respect to the second base, the object sensor senses whether an object is placed on the second base; when the object sensor senses that the object is placed on the second base, the object sensor sends out a sensed signal; the controller selectively switches on the brake in response to the sensed signal, so as to restrain a rotating angle formed by the first base and the second base.

2. The foldable electronic device of claim 1, further comprising:
a first gravity sensor disposed in the first base, the controller being electrically connected to the first gravity sensor; and
a second gravity sensor disposed in the second base, the controller being electrically connected to the second gravity sensor;
wherein the controller calculates a current angle formed by the first base and the second base according to a sensed result of the first gravity sensor and the second gravity sensor; when the object sensor sends out the sensed signal, the controller determines whether the current angle is larger than a predetermined angle in response to the sensed signal; when the current angle is larger than the predetermined angle, the controller switches off the brake; when the current angle is smaller than or equal to the predetermined angle, the controller switches on the brake.

3. The foldable electronic device of claim 2, further comprising a sound generator selectively disposed in one of the first base and the second base, the controller being electrically connected to the sound generator; wherein when the brake is switched off, the controller determining that the foldable electronic device is in a power-on state or a power-off state; when the foldable electronic device is in the power-off state, the controller controlling the sound generator to send out a prompt sound.

4. The foldable electronic device of claim 1, further comprising a sound generator selectively disposed in one of the first base and the second base, the controller being electrically connected to the sound generator; when the brake is switched on, the controller controlling the sound generator to send out a prompt sound.

5. The foldable electronic device of claim 1, wherein the object sensor is a magnetic sensor and disposed in the second base, and the object comprises a magnetic member.

6. The foldable electronic device of claim 1, wherein the object sensor is a touch sensor and disposed in the second base, and the object comprises a conductor.

7. The foldable electronic device of claim 1, wherein the object sensor is a depth sensor and disposed in the first base.

8. The foldable electronic device of claim 1, wherein the hinge comprises a rotating shaft, the rotating shaft has a first restraining portion, the brake comprises a braking member, the braking member has a second restraining portion; when the brake is switched from off to on, the braking member moves in a first direction with respect to the rotating shaft, such that the second restraining portion moves to a position corresponding to the first restraining portion, and the first restraining portion cooperates with the second restraining portion to restrain the rotating angle formed by the first base and the second base; when the brake is switched from on to off, the braking member moves in a second direction with respect to the rotating shaft, such that the second restraining portion is away from the first restraining portion; the first direction is opposite to the second direction.

9. A device protection method adapted to a foldable electronic device, the foldable electronic device comprising a first base, a second base, and a brake, the device protection method comprising steps of:

when the first base is expanded with respect to the second base, sensing whether an object is placed on the second base; and when sensing that the object is placed on the second base, selectively switching on the brake, so as to restrain a rotating angle formed by the first base and the second base.

10. The device protection method of claim 9, further comprising steps of:

calculating a current angle formed by the first base and the second base;

when sensing that the object is placed on the second base, determining whether the current angle is larger than a predetermined angle;

when the current angle is larger than the predetermined angle, switching off the brake; and when the current angle is smaller than or equal to the predetermined angle, switching on the brake.

11. The device protection method of claim 10, further comprising steps of :

when the brake is switched off, determining that the foldable electronic device is in a power-on state or a power-off state;

when the foldable electronic device is in the power-off state, sending out a prompt sound.

12. The device protection method of claim 9, further comprising step of:

when the brake is switched on, sending out a prompt sound.

13. The device protection method of claim 9, wherein the foldable electronic device further comprises a hinge, the hinge pivotally connects the first base to the second base, the brake is disposed in the hinge, the hinge comprises a rotating shaft, the rotating shaft has a first restraining portion, the brake comprises a braking member, the braking member has a second restraining portion, the device protection method further comprises steps of:

when the brake is switched from off to on, driving the braking member to move in a first direction with respect to the rotating shaft, such that the second restraining portion moves to a position corresponding to the first restraining portion, and the first restraining portion cooperates with the second restraining portion to restrain the rotating angle formed by the first base and the second base; and when the brake is switched from on to off, driving the braking member to move in a second direction with respect to the rotating shaft, such that the second restraining portion is away from the first restraining portion;

wherein the first direction is opposite to the second direction.

* * * * *